US006667869B2

(12) United States Patent
Greenberg

(10) Patent No.: US 6,667,869 B2
(45) Date of Patent: Dec. 23, 2003

(54) POWER CONTROL SYSTEM AND METHOD FOR ILLUMINATION ARRAY

(75) Inventor: Michael Philip Greenberg, Goffstown, NH (US)

(73) Assignee: Acuity Imaging, LLC, Nashua, NH (US)

( * ) Notice: Subject to any disclaimer, the term of this patent is extended or adjusted under 35 U.S.C. 154(b) by 125 days.

(21) Appl. No.: 10/047,949

(22) Filed: Jan. 14, 2002

(65) Prior Publication Data

US 2002/0149895 A1 Oct. 17, 2002

Related U.S. Application Data

(63) Continuation-in-part of application No. 09/512,575, filed on Feb. 24, 2000, now Pat. No. 6,349,023.

(51) Int. Cl.[7] .................................................. H02H 5/04

(52) U.S. Cl. ........................ 361/103; 361/93.8; 361/78; 361/86; 361/59

(58) Field of Search ................................. 361/103, 106, 361/78, 79, 86, 87, 93.8, 59, 60; 374/134, 163, 43; 363/50, 52, 55

(56) References Cited

U.S. PATENT DOCUMENTS

| | | | | | |
|---|---|---|---|---|---|
| 41,970 | A | * | 1/1864 | Siedband et al. | 361/42 |
| 4,001,649 | A | * | 1/1977 | Young | 361/42 |
| 4,052,744 | A | * | 10/1977 | Boothman et al. | 361/103 |
| 4,428,016 | A | * | 1/1984 | Brasfield | 361/18 |
| 4,628,397 | A | * | 12/1986 | Gareis et al. | 361/98 |
| 4,727,450 | A | * | 2/1988 | Fachinetti et al. | 361/103 |
| 5,073,838 | A | * | 12/1991 | Ames | 361/103 |
| 6,349,023 | B1 | * | 2/2002 | Greenberg | 361/103 |

* cited by examiner

*Primary Examiner*—Jonathan Salata
(74) *Attorney, Agent, or Firm*—Bourque & Associates, PA

(57) ABSTRACT

A power control system and method controls power supplied from a power source to a resistive load, such as a LED illumination array, to prevent the load from exceeding a high temperature limit. The power control system and method generates a pulse train that represents heating in the load and uses digital logic to model the load temperature and calculate a temperature out value. When the temperature out value increases to reach a high temperature limit value, the power source is disconnected from the load. When the temperature out value decreases to reach a base temperature value, the power source is re-connected to the load.

23 Claims, 5 Drawing Sheets

POWER CONTROL SYSTEM AND METHOD FOR ILLUMINATION ARRAY

CROSS-REFERENCE TO RELATED APPLICATIONS

This application is a continuation-in-part of patent application Ser. No. 09/512,575 filed on Feb. 24, 2000, now U.S. Pat. No. 6,349,023 which is fully incorporated herein by reference.

TECHNICAL FIELD

The present invention relates to control systems for controlling power supplied to a dissipative/resistive load, and in particular, a power control system that protects an LED illumination array from reaching life-shortening or destructive temperature levels.

BACKGROUND INFORMATION

Sophisticated illumination systems and methods have been developed, for example, for use in the inspection of electronic components. One such illumination system, which is especially suitable for illuminating ball grid arrays (BGAs), which are commonly used in manufacturing electronic components, is disclosed, for example, in commonly-owned U.S. Pat. No. 5,943,125, which is fully incorporated herein by reference. U.S. Pat. No. 5,943,125 teaches the use of a ring-shaped light source, which includes a plurality of light emitting elements, such as light emitting diodes (LEDs). While this light source is designed especially for use in illuminating BGAs for inspection purposes, various configurations of LED arrays may be employed for a wide variety of illumination sources for a wide variety of inspection applications.

One drawback of using LED arrays as illumination sources, however, is that LEDs are dissipative (resistive) loads. As a dissipative/resistive load is powered, it will heat up. If the heat build up is allowed to progress uncontrolled, the temperature of the array may reach a destructive or life-shortening level.

Various systems and methods have been employed in the past to prevent dissipative/resistive loads from exceeding certain pre-defined life-shortening temperature levels. More sophisticated control systems have been employed as well to ensure that the peak and average temperatures of the LED array fall within safe limits. One such system controls the temperature of an LED array by enforcing a maximum pulse width of an LED power signal (during which the LED array is powered) and a minimum off time between pulses. This type of control system employs a simple digital circuit that generates a delay after each pulse.

A slightly more sophisticated prior art system computes an inter-pulse minimum delay based on the then-current pulse width. An even more sophisticated prior art system even takes the pulse repetition rate into account.

Since all of the prior art control systems are based on theoretical average thermal characteristics, they do not take into account the real-time, actual heat generation of an LED array. Therefore, a margin of safety must be factored into all prior art control systems. These built-in safety margins necessarily reduce the actual time of array illumination, which in turn limits the throughput of the inspection systems with which they are associated.

One solution to the problem with prior art control systems is to provide a power control circuit suitable for use in controlling dissipative/resistive loads (e.g., LED illumination arrays), which accurately models the heat being generated by the resistive load that it is controlling. In this manner, arbitrary, built-in safety margins can be eliminated, which provides an improvement in inspection system throughput. It also makes it possible to input a complex series of pulses of varying widths and intervals, such that power to the LED array could be arbitrarily switched without restriction, provided the modeled maximum temperature limit was not exceeded.

The control circuit discussed above, however, requires carefully calibrated and accurate low leakage analog components, especially when temperature calculations require a large ratio of charge (heating analog) to discharge (cooling analog) time constant. The analog control circuit for modeling temperature can thus be costly and requires careful layout and component selection.

Accordingly, there is a need for a power control system and method that models temperature with minimal or no analog components.

SUMMARY

According to one aspect of the present invention, a power control system for controlling power supplied from a power source to a resistive load to prevent the resistive load from exceeding a predetermined high temperature limit. A regulator circuit is coupled between the power source and the resistive load for supplying controllable power levels to the resistive load. The power control system comprises a pulse train generating circuit for converting power impulses received from the regulator circuit into a heating pulse train representing power flowing to the resistive load. A load temperature calculation circuit is coupled to the pulse train generating circuit. The load temperature calculation circuit includes digital logic for producing a temperature out value substantially representing a present temperature of the resistive load.

A temperature comparison circuit is coupled to the load temperature calculation circuit and the regulator circuit. The temperature comparison circuit selectively compares the temperature out value to at least one of a high temperature limit value and a base temperature value. The temperature comparison circuit causes the power source to be disconnected from the resistive load when the temperature out value reaches the high temperature limit value. The temperature comparison circuit causes the power source to be reconnected to the resistive load when the temperature out value reaches the base temperature value.

According to one embodiment of the power control system, a pulse rate generator circuit including one or more oscillators generates heating and cooling pulse rates. An AND gate receives the heating pulse rate from the pulse rate generator circuit and receives a power control pulse from the regulator circuit. The heating pulse rate and the power control pulse cause the AND gate to output a heating pulse train such that the number of pulses out of the AND gate is proportional to the total energy delivered to the resistive load.

An up/down counter is coupled to the pulse rate generator circuit and receives the heating pulse train, which is applied to an up input of the up/down counter. The up/down counter outputs a temperature out value substantially representing a present temperature of the resistive load. A rate multiplier is coupled to the up/down counter and to the pulse rate generator circuit for generating a cooling pulse train, which is applied to a down input of the up/down counter. A temperature comparison circuit receives the temperature out value and provides a power control signal to the regulator circuit to disconnect or re-connect the power source.

According to one method of controlling power supplied from the power source to the resistive load, a heating pulse train representing power flowing to the resistive load is generated. Load temperature is modeled using digital logic and the heating pulse train to generate a temperature out value substantially representing a present temperature of the resistive load. The temperature out value is compared to a high temperature limit value, and the power source is disconnected from the resistive load if the temperature out value exceeds the high temperature limit value. The temperature out value is compared to a base temperature value, and the power source is re-connected to the resistive load if the temperature out value reaches the base temperature value.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
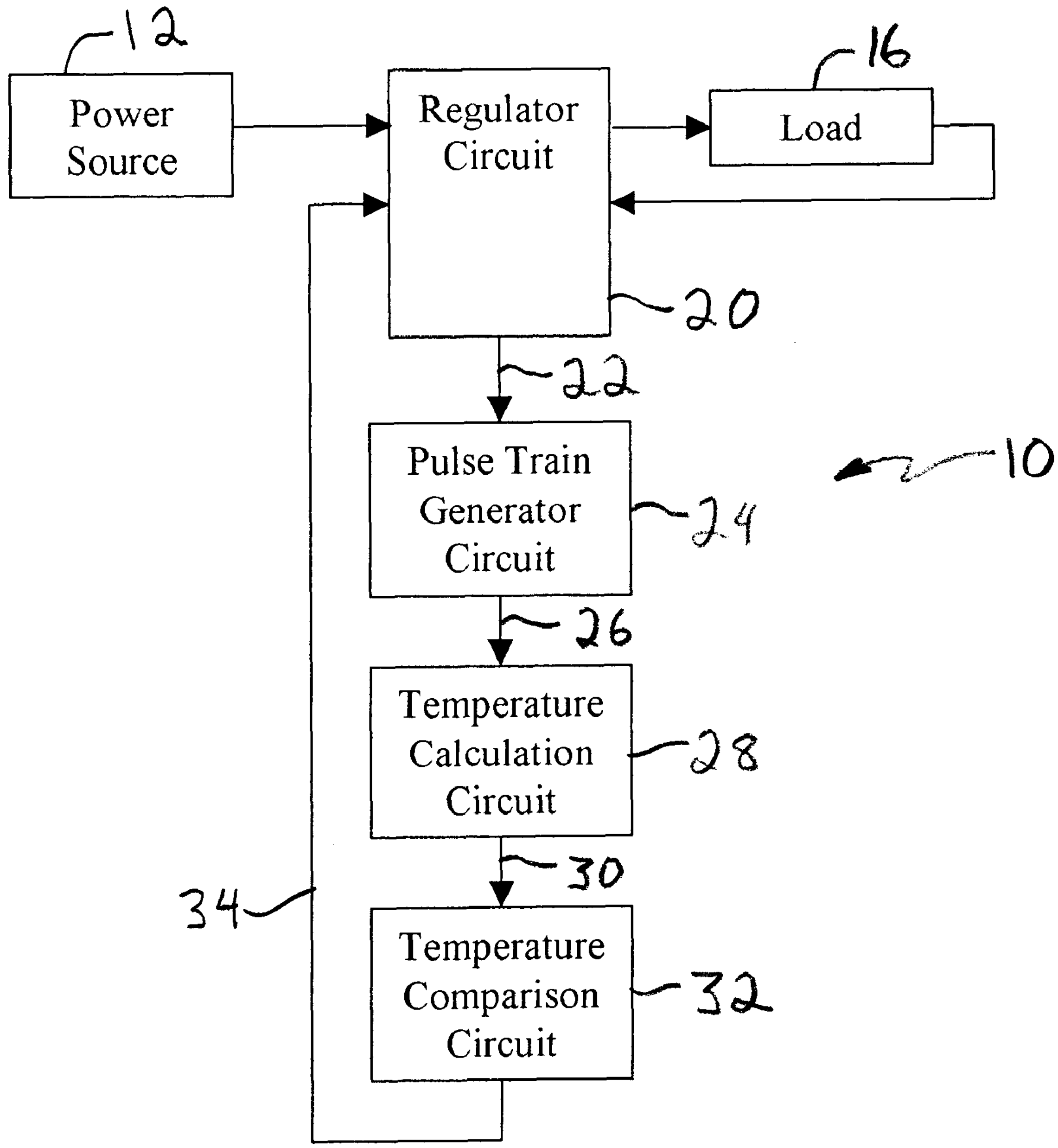
FIG. 1 is a schematic functional block diagram of a power control system used to control power supplied to a resistive load, according to the present invention.

A power control system 10, FIG. 1, according to one aspect of the present invention, is used to control power supplied from a power source 12 to a dissipative/resistive load 16. In general, the power control system 10 includes a regulator circuit 20, a pulse train generator circuit 24, a temperature calculation circuit 28 and a temperature comparison circuit 32. The power control system 10 uses digital differential analyzer (DDA) techniques to perform the analog computations described in the commonly owned U.S. Pat. No. 6,349,023 (Ser. No. 09/512,575), which is fully incorporated herein by reference. Exemplary embodiments of these circuits are described in greater detail below. One embodiment of the load 16 is a LED illumination array, although other types of dissipative/resistive loads are contemplated.

Figure 2:
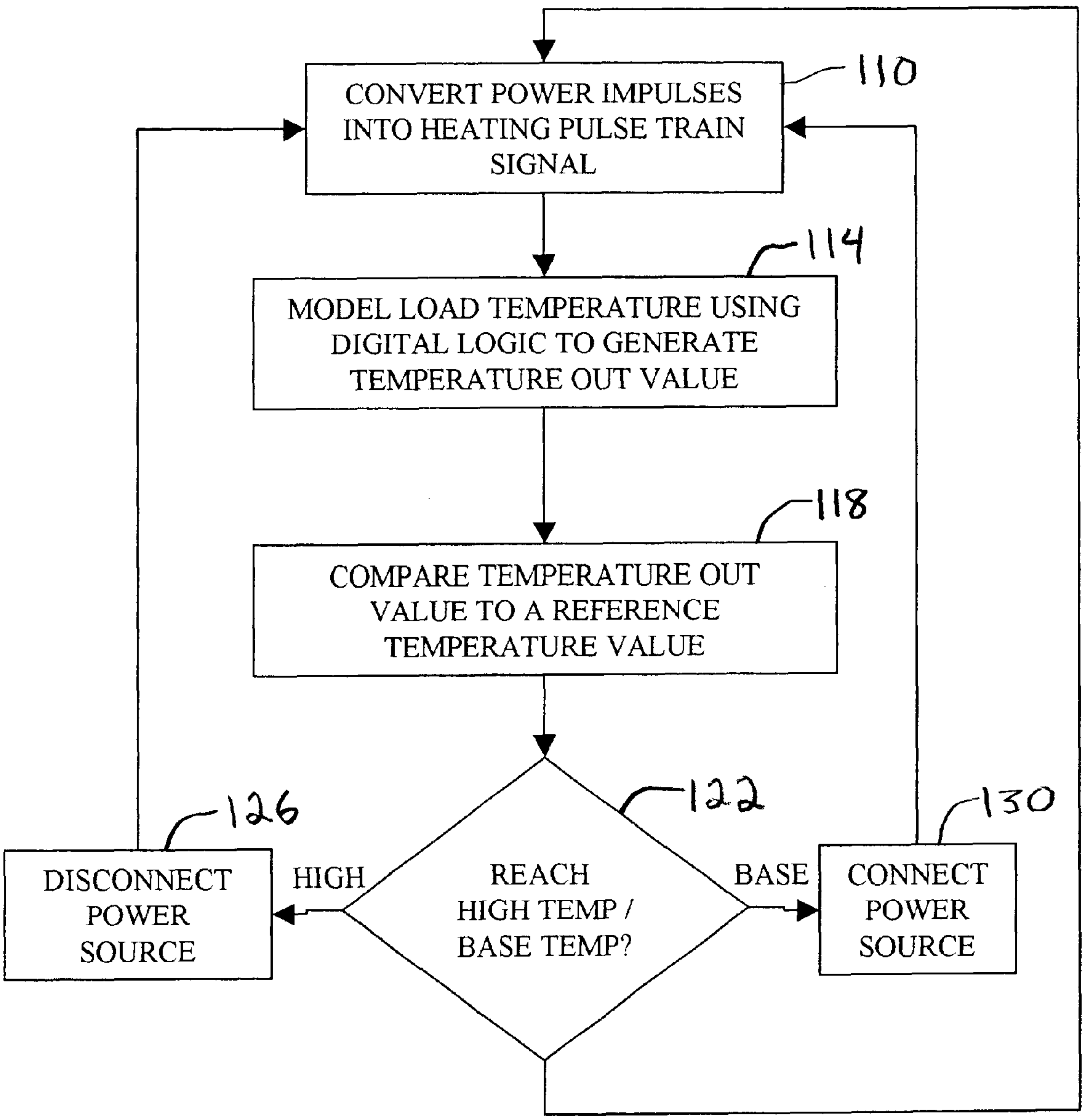
FIG. 2 is a flow chart illustrating a method of controlling power, according to the present invention.

Referring to FIGS. 1 and 2, one method of controlling power supplied from the power source 12 to the load 16 using the power control system 10 is described. The pulse train generator circuit 24 converts power impulses 22 from the regulator circuit 20 into a heating pulse train 26 representing power flowing to the resistive load 16, step 110. The load temperature calculation circuit 28 models the load temperature using digital logic to generate a temperature out value 30 representing a present temperature of the load 16, step 114.

The temperature comparison circuit 32 compares the temperature out value 30 to one or more reference temperature values, such as high temperature limit value and/or a base temperature value, step 118. When the power supply 12 is connected to the load 16, the temperature out value 30 calculated by the temperature calculation circuit 28 increases. When the temperature out value 30 increases to reach the high temperature limit value, step 122, the power source 12 is disconnected from the load 16, step 126. When the power supply 12 is disconnected from the load 16, the temperature out value 30 calculated by the temperature calculation circuit 28 decreases. When the temperature out value 30 decreases to reach the base temperature value, step 122, the power source 12 is re-connected to the load 16, step 130. To disconnect and connect the power source 12, the temperature comparison circuit 32 sends a power enable signal 34 to the regulator circuit 20.

In one embodiment, the regulator circuit 20 is a switching regulator with current feedback, which supplies controllable power levels to the load 16 such as a LED lighting array. One example is a switching regulator intended for battery charger applications.

Figure 3:
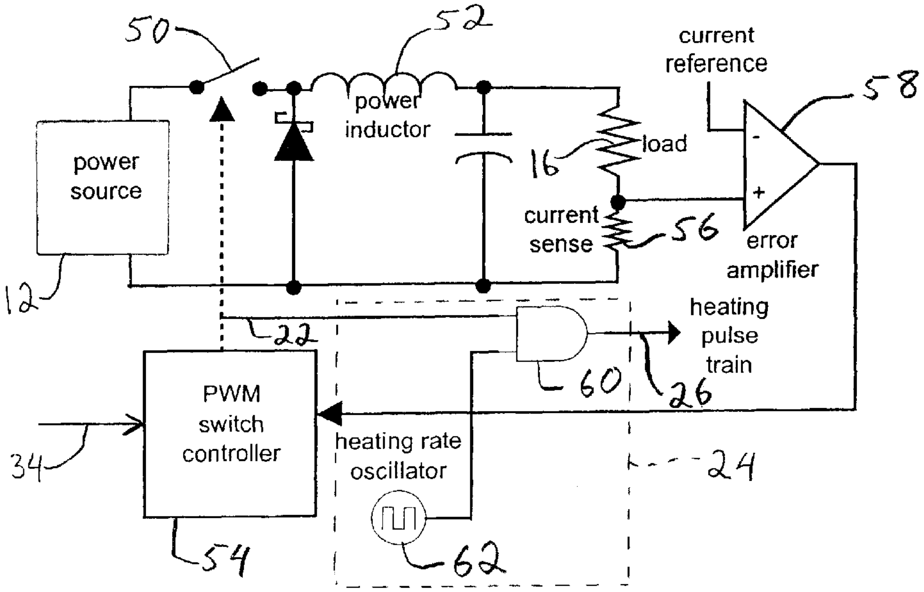
FIG. 3 is a schematic diagram of a regulator circuit and a pulse train generator circuit used to control power supplied to a resistive load, according to one embodiment of the present invention.

One embodiment of a typical switching regulator circuit used in the present invention is shown in FIG. 3. In this embodiment, a switch 50 connects the power source 12 and voltage is supplied to the load 16 across a power inductor 52. A pulse width modulation (PWM) switch controller 54 is coupled to the switch 50. The PWM switch controller 54 provides a pulse width control signal, which turns on the switch 50 for charging the inductor 52. The pulse width of the control signal is proportional to the amount of energy delivered to the load 16. A current sensing resistor 56 is coupled in series with the load 16 and registers a voltage proportional to the instantaneous current in the load 16. An error amplifier 58 is coupled between the load 16 and current sensing resistor 56 and provides a feedback signal to the PWM switch controller 54.

In this embodiment, the pulse train generator circuit 24 includes an AND gate 60 and a heating rate clock oscillator 62. The clock oscillator 62 generates a heating pulse rate and preferably has a frequency much higher (e.g., by a factor of about 20 or more) than the regulator switching frequency. In one example, if the PWM switch controller 54 ran at 100 KHz, the clock oscillator 62 would run at 2 MHz. Other frequencies are possible for the clock oscillator 62 depending upon the desired accuracy of the temperature estimate and practical design considerations. Each switching regulator pulse causes the AND gate 60 to output a number of pulses proportional to the pulse width, thereby generating the heating pulse train 26. Over time, the total number of pulses out of the AND gate 60 is proportional to the power source voltage applied to the inductor 52 and thus to the total energy delivered to the load 16. Thus, the heating pulse train 26 represents heat flowing to the load 16. The switching pulse is preferably resynchronized to the oscillator pulse rate for stable counting.

In one preferred embodiment, the pulse train generator circuit 24 adjusts the pulse rate according to the voltage across the inductor 52 to provide a more accurate measure of power to the load 16. One way of making this adjustment is by varying the clock oscillator frequency using a voltage to frequency converter with a frequency control voltage based on the power source voltage minus the load voltage. One example of a voltage to frequency converter is a voltage controlled oscillator (VCO). Another example is a multivibrator in which the charging current or voltage connected to the R-C time constant charging circuit is proportional to the control voltage.

Figure 4:
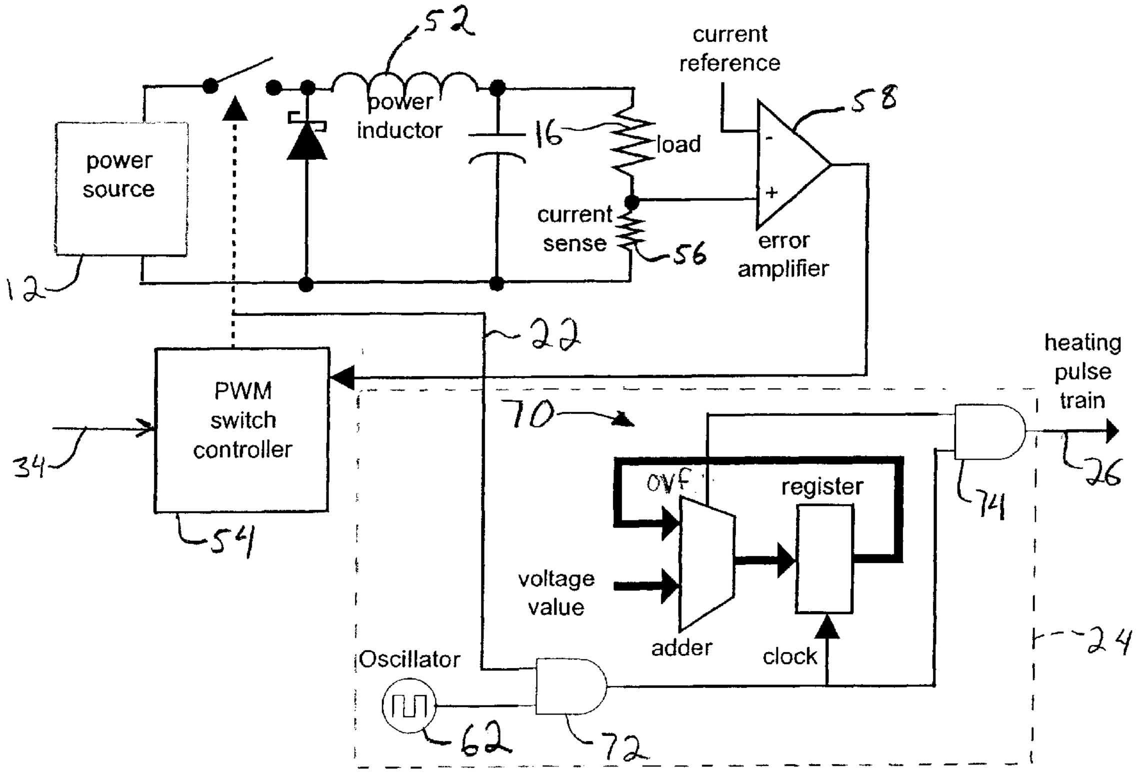
FIG. 4 is a schematic diagram of a regulator circuit and a pulse train generator circuit used to control power supplied to a resistive load, according to another embodiment of the present invention.

Another way to adjust the pulse rate according to the voltage across the inductor 52 is shown in FIG. 4. In this exemplary embodiment, an accumulator 70 is coupled to a first AND gate 72, which receives the power impulses 22 and heating pulse rate from oscillator 62. A digital integer proportional to voltage (i.e., a voltage value) is added to the accumulator 70 on each oscillator or AND gate output pulse. Each time the accumulator 70 overflows, an output pulse is generated. The overflow output can be synched to the clock, for example, using second AND gate 74 that outputs the heating pulse train 26. The resulting pulse train rate total better approximates total energy because it represents the product of voltage times the time it was applied to the inductor 52. The voltage value can be derived by measuring the load voltage with an analog-to-digital converter and subtracting this value from the known or measured power source voltage. Other circuits for adjusting the pulse rate according to voltage across the inductor are also contemplated.

According to a further embodiment of the pulse train generator circuit 24, the heating pulse train 26 is generated by applying the current sense voltage signal to a voltage to frequency converter. Voltage to frequency converters are well-known in the art. In one example, this method uses a multivibrator with a voltage controlled time constant and having a wide operating range and a control voltage proportional to the measured load current (e.g., the voltage drop across the current sensing resistor 56). This method of obtaining the heating pulse train 26 can be used with any type of power regulator including a simple power switch and voltage regulator.

Figure 5:
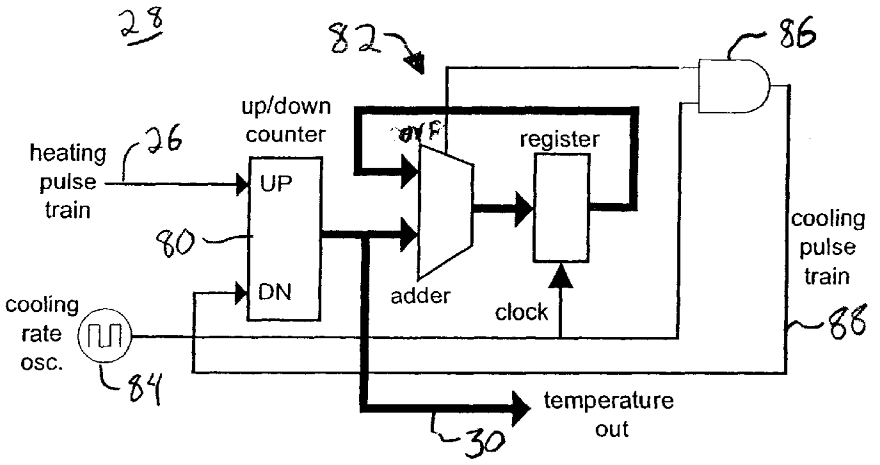
FIG. 5 is a schematic diagram of a temperature calculation circuit, according to one embodiment of the present invention.

One embodiment of the temperature calculation circuit 28 is shown in greater detail in FIG. 5. This temperature calculation circuit can be used with any of the embodiments of the pulse train generator circuit 24 described above. The temperature calculation circuit 28 includes an up/down counter 80 coupled to the pulse train generator circuit 24. An accumulator 82 is coupled to the up/down counter 80 and a cooling rate oscillator 84. An AND gate 86 can be coupled to the accumulator 82 and the cooling rate oscillator 84 to synch the overflow output to the clock.

In operation, the heating pulse train 26 is applied to the UP input of the up/down counter 80. The contents of the up/down counter 80 represent the load temperature rise above ambient (i.e., the temperature out value 30). The counter contents are added to the accumulator 82 and the output overflows from the accumulator 82 are applied to the AND gate 86 with a cooling pulse rate from the cooling rate oscillator 84 to generate a cooling pulse train 88 representing cooling. The cooling pulse train 88 output from the AND gate 86 is applied to the DOWN input of the up/down counter 80.

The rate at which the addition occurs is preferably adjusted to model the cooling path time constant, while the rate of generating the UP pulse train is preferably scaled (e.g., using known methods) to represent the heating time constant. For example, the constant of proportionality of the numeric value in the counter 80 to the simulated load temperature is chosen. The rate of the heating pulse train is scaled to represent dq/(Rh★Cm), where dq is the quantum of energy represented by each pulse, Rh is the heating thermal resistance, and Cm is the thermal mass of the load. Similarly, the cooling rate is scaled so that each count also represents a quantum of heat flowing through the cooling path, which is proportional to the current temperature and inversely to the cooling thermal resistance Rc, i.e., dq=T/(Rc★Cm). The cooling rate oscillator 84 can be adjusted to be slower than the heating rate oscillator 62 by the ratio Rc/Rh.

Figure 6:
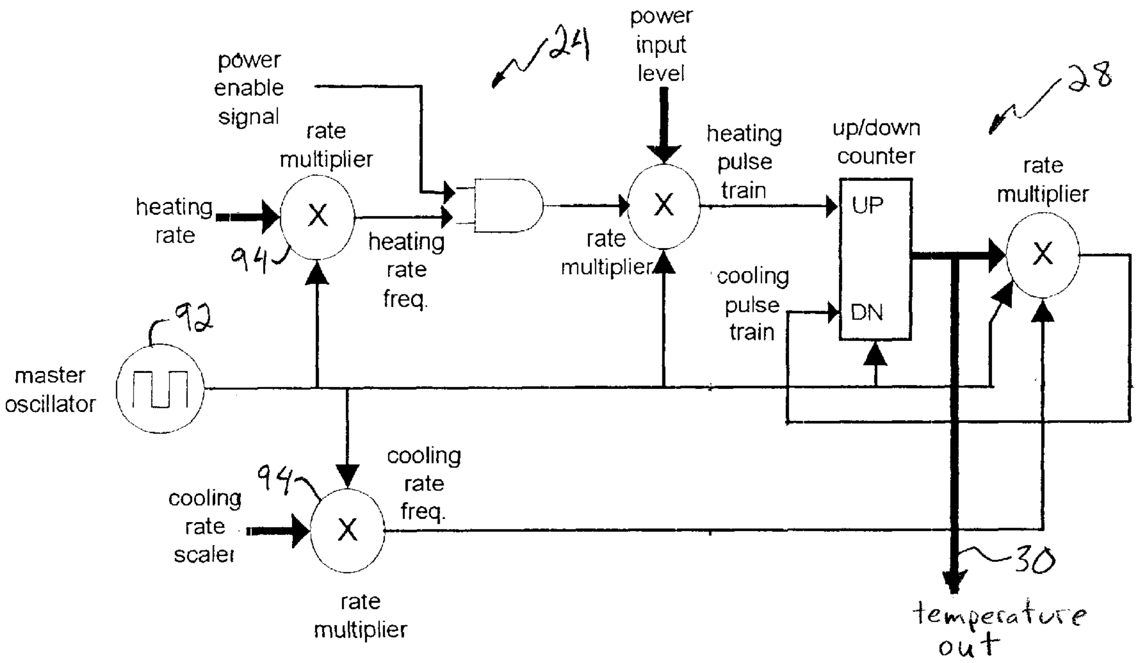
FIG. 6 is a schematic diagram of a pulse train generator circuit and a temperature calculation circuit, according to another embodiment of the present invention.
Figure 7:
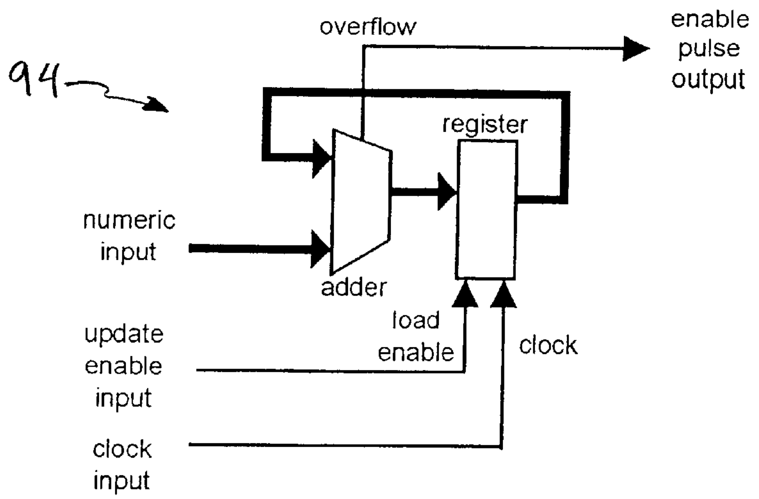
FIG. 7 is a schematic diagram of a rate multiplier used in the circuit shown in FIG. 6.

Another embodiment of the pulse train generator circuit 24 and temperature calculation circuit 28 is shown in FIGS. 6. In this embodiment, a pulse rate generator circuit including a single master clock oscillator 92 with additional rate multipliers 94 is used to generate the heating and cooling pulse rates. In this embodiment, the power input level can be derived by converting the power voltage minus the load voltage to a numeric value using an ADC. Alternatively, the heating pulse train can be generated directly by gating the heating rate frequency signal with a resynchronized version of the power switch pulse. One example of the rate multiplier 94 is shown in greater detail in FIG. 7. The output rate is a function of the ratio of the numeric input value to the full scale accumulator value times the update enable rate.

A master timing circuit using the single clock oscillator 92 can also generate the switching frequency for the switching current regulator (as shown in FIG. 3) or for a switching voltage regulated power source (not shown). Although exemplary embodiments are shown and described herein, other embodiments of the pulse train generator circuit 24 and the temperature calculation circuit 28 employing known DDA techniques are contemplated.

Figure 8:
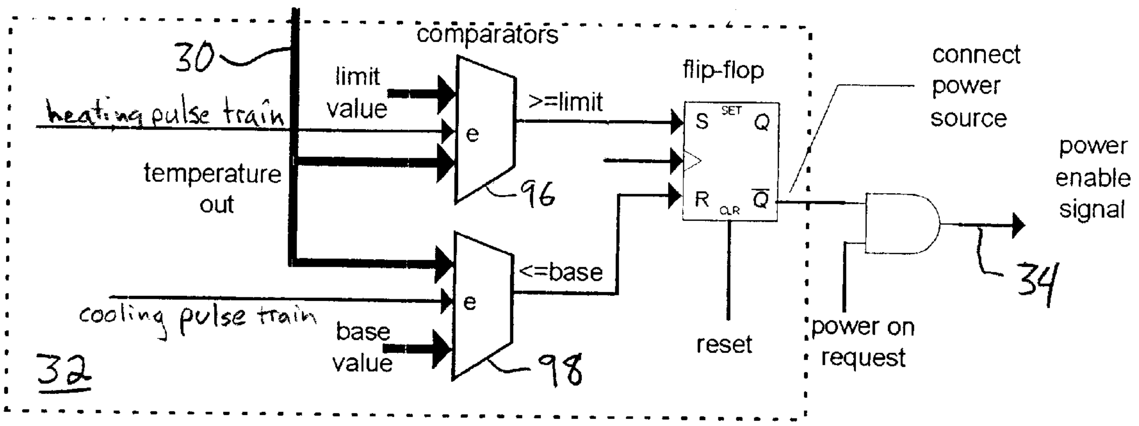
FIG. 8 is a schematic diagram of a temperature comparison circuit, according to one embodiment of the present invention.

The temperature comparison circuit 32 can be implemented using logic similar to that disclosed in pending application Ser. No. 09/512,575 or using any other type of logic known to those skilled in the art. One embodiment of the temperature comparison circuit 32 is shown in FIG. 8. This embodiment of the temperature comparison circuit 32 includes a high temperature comparator 96 for comparing the temperature out value 30 to the high temperature limit value and a base temperature comparator 98 for comparing the temperature out value 30 to the base temperature limit value.

Accordingly, the power control system of the present invention controls power supplied to a resistive load to prevent the load from exceeding a high temperature limit using a circuit with fewer analog components. In particular, the power control system effectively determines power flowing to the load by converting switching regulator power impulses to a pulse train representing heating and models temperature using digital logic.

Modifications and substitutions by one of ordinary skill in the art are considered to be within the scope of the present invention, which is not to be limited except by the following claims.

The invention claimed is:

1. A power control system for controlling power supplied from a power source to a resistive load to prevent said resistive load from exceeding a predetermined high temperature limit, wherein a regulator circuit is coupled between said power source and said resistive load for supplying controllable power levels to said resistive load, said power control system comprising:

a pulse train generating circuit for converting power impulses received from said regulator circuit into a heating pulse train representing power flowing to said resistive load;

a load temperature calculation circuit coupled to said pulse train generating circuit, wherein said load temperature calculation circuit includes digital logic for producing a temperature out value substantially representing a present temperature of said resistive load; and a temperature comparison circuit coupled to said load temperature calculation circuit and said regulator circuit, wherein said temperature comparison circuit selectively compares said temperature out value to at least one of a high temperature limit value and a base temperature value, wherein said temperature comparison circuit causes said power source to be disconnected from said resistive load when said temperature out value reaches said high temperature limit value, and wherein said temperature comparison circuit causes said power source to be reconnected to said resistive load when said temperature out value reaches said base temperature value.

2. The power control system of claim 1 wherein said pulse train generator circuit comprises:

an AND gate receiving a power control pulse from said regulator circuit; and a heating rate oscillator coupled to said AND gate, wherein said oscillator and said power control pulse cause said AND gate to output said heating pulse train such that the number of pulses out of said AND gate is proportional to the total energy delivered to said resistive load.

3. The power control system of claim 1 wherein said pulse train generator circuit comprises:

an AND gate receiving a power control pulse from said regulator circuit;

a heating rate oscillator coupled to said AND gate;

an accumulator coupled to said AND gate, for generating said heating pulse train.

4. The power control system of claim 1 wherein voltage is applied to said load across an inductor, and wherein said pulse train generator circuit adjusts the pulse rate according to said voltage across said inductor.

5. The power control system of claim 1 wherein said temperature calculation circuit comprises:

an up/down counter coupled to said pulse train generator circuit, wherein said heating pulse train is applied to an up input of said up/down counter, and wherein said up/down counter outputs a temperature out value;

a cooling rate oscillator;

an accumulator coupled to said up/down counter and said cooling rate oscillator, wherein overflows from said accumulator generate a cooling pulse train, and wherein said cooling pulse train is applied to a down input of said up/down counter.

6. The power control system of claim 2 wherein said temperature calculation circuit comprises:

an up/down counter coupled to said AND gate, wherein said heating pulse train is applied to an up input of said up/down counter, and wherein said up/down counter outputs a temperature out value;

a cooling rate oscillator;

an accumulator coupled to said up/down counter and to said cooling rate oscillator, wherein overflows from said accumulator a cooling pulse train, and wherein said cooling pulse train is applied to a down input of said up/down counter.

7. The power control system of claim 3 wherein said temperature calculation circuit comprises:

an up/down counter coupled to said second AND gate, wherein said heating pulse train is applied to an up input of said up/down counter, wherein said up/down counter outputs a temperature out value;

a cooling rate oscillator;

an accumulator coupled to said up/down counter and to said cooling rate oscillator, wherein overflows from said accumulator generate a cooling pulse train, and wherein said cooling pulse train is applied to a down input of said up/down counter.

8. The power control system of claim 1 wherein said pulse train generating circuit comprises a voltage to frequency converter coupled to said regulator circuit, wherein a current sense voltage is applied to said voltage to frequency converter for producing said heating pulse train.

9. A power control system for controlling power supplied from a power source to a resistive load to prevent said resistive load from exceeding a predetermined high temperature limit, wherein a regulator circuit is coupled between said power source and said resistive load for supplying controllable power levels to said resistive load, said power control system comprising:

a pulse rate generator circuit for generating heating and cooling pulse rates;

an AND gate receiving said heating pulse rate from said pulse rate generator circuit and receiving a power control pulse from said regulator circuit, wherein said heating pulse rate and said power control pulse cause said AND gate to output a heating pulse train such that the number of pulses out of said AND gate is proportional to the total energy delivered to said resistive load;

an up/down counter receiving said heating pulse train and coupled to said pulse rate generator circuit, wherein said heating pulse train is applied to an up input of said up/down counter, and wherein said up/down counter outputs a temperature out value substantially representing a present temperature of said resistive load;

a rate multiplier coupled to said up/down counter and said pulse rate generator circuit, for generating a cooling pulse train, and wherein said cooling pulse train is applied to a down input of said up/down counter; and a temperature comparison circuit receiving said temperature out value and providing a power control signal to said regulator circuit, wherein said temperature comparison circuit selectively compares said temperature out value to at least one of a high temperature limit value and a base temperature value, wherein said temperature comparison circuit causes said power source to be disconnected from said resistive load when said temperature out value reaches said high temperature limit value, and wherein said temperature comparison circuit causes said power source to be reconnected to said resistive load when said temperature out value reaches said base temperature value.

10. The power control system of claim 9 wherein said pulse rate generating circuit includes a heating rate oscillator for generating said heating pulse rate and a cooling rate oscillator for generating said cooling pulse rate.

11. The power control system of claim 9 wherein said pulse rate generating circuit includes a single oscillator and a heating rate multiplier, for generating said heating pulse rate and a cooling rate multiplier for generating said cooling pulse rate.

12. The power control system of claim 9 further comprising a rate multiplier coupled between said AND gate and said up/down counter for adjusting said heating pulse train.

13. A power control system for controlling power supplied from a power source to a resistive load to prevent said resistive load from exceeding a predetermined high temperature limit, said power control system comprising:

a regulator circuit for supplying controllable power levels from said power source to said resistive load;

a pulse train generating circuit coupled to said regulator circuit for converting power impulses into a heating pulse train representing power flowing to said resistive load;

a load temperature calculation circuit coupled to said pulse train generating circuit, wherein said load temperature calculation circuit includes digital logic for producing a temperature out value substantially representing a present temperature of said resistive load; and a temperature comparison circuit coupled to said load temperature calculation circuit and said regulator circuit, wherein said temperature comparison circuit selectively compares said temperature out value to at least one of a high temperature limit value and a base temperature value, wherein said temperature comparison circuit causes said power source to be disconnected from said resistive load when said temperature out value reaches said high temperature limit value, and wherein said temperature comparison circuit causes said power source to be reconnected to said resistive load when said temperature out value reaches said base temperature value.

14. The power control system of claim 13 wherein said regulator circuit comprises:

a power inductor coupled to said resistive load;

a switch for connecting said power source to said power inductor;

a pulse width modulation switch controller for providing a power control pulse to control said switch;

a current sensing resistor connected in series with said resistive load for registering a voltage proportional to a current in said resistive load; and an error amplifier for providing a feedback signal from said current sensing resistor to said pulse width modulation switch controller.

15. The power control system of claim 14 wherein said pulse train generating circuit comprises:

an AND gate receiving a power control pulse from said pulse width modulation switch controller; and an oscillator coupled to said AND gate, wherein said oscillator and said power control pulse cause said AND gate to output said heating pulse train such that the number of pulses out of said AND gate is proportional to the total energy delivered to said resistive load.

16. The power control system of claim 14 wherein said pulse train generator circuit comprises:

an AND gate receiving a power control pulse from said pulse width modulation switch controller;

an oscillator;

a heating rate multiplier coupled to said oscillator and to said AND gate; and a rate multiplier coupled to said AND gate and to a power input level, for generating said heating pulse train.

17. The power control system of claim 14 wherein said pulse train generator circuit adjusts the pulse rate according to voltage across said inductor.

18. The power control system of claim 14 wherein said temperature calculation circuit comprises:

an up/down counter receiving said heating pulse train, wherein said heating pulse train is applied to an up input of said up/down counter, and wherein said up/down counter outputs a temperature out value; and a rate multiplier coupled to said up/down counter, for generating a cooling pulse train, wherein said cooling pulse train is applied to a down input of said up/down counter.

19. The power control system of claim 12 wherein said regulator circuit includes a voltage regulator, wherein said pulse train generating circuit includes a voltage to frequency converter, and wherein a current sense voltage signal is applied to said voltage to frequency converter.

20. A method of controlling power supplied from a power source to a resistive load to prevent said resistive from exceeding a predetermined high temperature limit, wherein a regulator circuit is coupled between said power source and said resistive load, said method comprising:

generating a heating pulse train representing power flowing to said resistive load;

modeling a load temperature using digital logic and said heating pulse train to generate a temperature out value substantially representing a present temperature of said resistive load;

comparing said temperature out value to a high temperature limit value;

disconnecting said power source from said resistive load if said temperature out value exceeds said high temperature limit value;

comparing said temperature out value to a base temperature value; and re-connecting said power source to said resistive load if said temperature out value reaches said base temperature value.

21. The method of claim 20 wherein the step of generating said heating pulse train comprises applying a power control pulse to a pulse train generating circuit.

22. The method of claim 20 wherein the step of generating said heating pulse train comprises applying a current sense voltage to a voltage to frequency converter.

23. A system for controlling power supplied from a power source to a resistive load to prevent said resistive from exceeding a predetermined high temperature limit, wherein a regulator circuit is coupled between said power source and said resistive load, said system comprising:

means for generating a heating pulse train representing power flowing to said resistive load;

means for modeling a load temperature using digital logic and said heating pulse train to generate a temperature out value substantially representing a present temperature of said resistive load;

means for comparing said temperature out value to at least one of a high temperature limit value and a base temperature value; and means for disconnecting said power source from said resistive load if said temperature out value exceeds said high temperature limit value and for re-connecting said power source to said resistive load if said temperature out value reaches said base temperature value.

* * * * *